United States Patent [19]

Miller

[11] 3,839,201

[45] Oct. 1, 1974

[54] REVERSE OSMOSIS SEPARATOR UNIT

[76] Inventor: Edward F. Miller, 11102 Whisperwood Ln., Rockville, Md. 20852

[22] Filed: Dec. 18, 1972

[21] Appl. No.: 315,929

[52] U.S. Cl................. 210/22, 210/23, 210/321, 210/500
[51] Int. Cl............................................ B01d 13/00
[58] Field of Search........ 210/338, 342, 22, 23, 315, 210/321, 240, 256

[56] References Cited
UNITED STATES PATENTS
3,355,382   11/1967   Huntington................... 210/22

*Primary Examiner*—Frank A. Spear, Jr.
*Assistant Examiner*—Ferris Lander
*Attorney, Agent, or Firm*—Flynn and Frishauf

[57] ABSTRACT

A reverse osmosis separator unit is comprised of a plurality of semi-permeable membranes assembled in an annular arrangement. Each membrane defines a respective reverse osmosis stage, and the space surrounding the outermost membrane is the last stage. A feed solution under pressure is fed to at least one of the stages, and an outlet is connected to each of the stages for drawing off the solution from each stage after the feed solution has passed through at least a longitudinal portion of the respective stage. The pressure of the input (feed) solution is sufficient to maintain the pressure in the first stage substantially above the osmotic pressure in the annular stages to permit a portion of the feed solution to permeate and pass through the respective membranes, without requiring additional pressurization. The unit is preferably enclosed by an outer casing, and the solution which permeates and passes through the final stage, which is the space between the outer membrane and the outer casing, is drawn off as separated output. Valves are preferably incorporated in each of the outlet lines, including both inter-stage concentrated solution draw-offs in the direction axial to the permeate flow (i.e., at the ends of the annulus areas) and in the permeate outlet line from the last stage.

18 Claims, 4 Drawing Figures

REVERSE OSMOSIS SEPARATOR UNIT

FIELD OF INVENTION

This invention has to do with a reverse osmosis separator unit and with a process in which said unit is employed.

BACKGROUND OF THE INVENTION

Reverse osmosis involves the use of semipermeable membranes which, under the application of pressure to a feed stream, permit passage of water molecules but hold back all or part of the undesired solute in the feed stream. In the desalination of salt-containing waters such as brackish waters and seawater, several desalination stages may be employed to effect a stepwise reduction in the salinity of the feedwaters to potability levels or better. The feedwater, under pressure, is charged to a first unit containing a semi-permeable membrane, and a water product of lesser solute content is obtained together with a stream of greater solute content. The degree of desalination achieved is dependent on the salt-rejection characteristic of the semi-permeable membrane employed. The water product is then re-pressurized and charged to a second unit containing the same or different type of semi-permeable membrane with the same or different salt-rejection characteristic, with the result that a relatively purer water product is obtained together with a stream of greater solute content than the repressurized water product. Thus, inter-stage repressurization is employed, with concomitant increase in plant investment and operating costs. In particular, energy requirements for the plant are substantial.

This invention is directed to substantially reducing or eliminating the need for inter-stage repressurization and to permit the utilization of a series of low to intermediate salt-rejection semipermeable membranes in annular arrangement instead of a single or more high salt rejection membranes thus materially reducing the overall energy requirements of a reverse osmosis plant.

SUMMARY OF THE INVENTION

In accordance with this invention, there is provided a reverse osmosis separator unit comprising a plurality of semi-permeable membranes assembled in annulated arrangement and defining reverse osmosis stages interior thereof. A pressurized charge inlet is connected to at least one of said stages, and an outlet is connected to each of said stages, for drawing off the solution from each stage after the solution has passed through at least a longitudinal portion of the respective stage.

In a preferred arrangement, an outer shell surrounds the outer membrane and an outlet is connected to the stage defined by the space between said outer membrane and said shell. Further valves may be used in the outlet lines to vary the internal pressures in the stages, and in the outlet line from the outer shell (last stage).

In accordance with this invention, there is also provided a process for removing inorganic salts from an aqueous solution (1) containing the same, comprising a. forcing the solution (1), under pressure, through a first reverse osmosis membrane defining a first stage of a reverse osmosis separator unit comprising a plurality of semi-permeable membranes in an annulated arrangement defining respective stages and having a charge inlet connected to said first stage and an outlet connected to each stage thereof, and obtaining in an annular stage adjacent said first stage an aqueous solution (2) of lesser salt content than of said solution (1), and b. forcing said solution (2), under pressure, from said adjacent annular stage through a second reverse osmosis membrane of said unit and obtaining in a subsequent annular stage adjacent said first-mentioned annular stage an aqueous solution (3) of lesser salt content than solution (2), c. and maintaining the pressure in said first stage substantially above the osmotic pressure in said first-mentioned annular stage to permit passage of said solution (1) through said first reverse osmosis membrane and passage of said solution (2) through said second reverse osmosis membrane.

DRAWINGS

SPECIFIC EMBODIMENTS OF THE INVENTION

Figure 1:
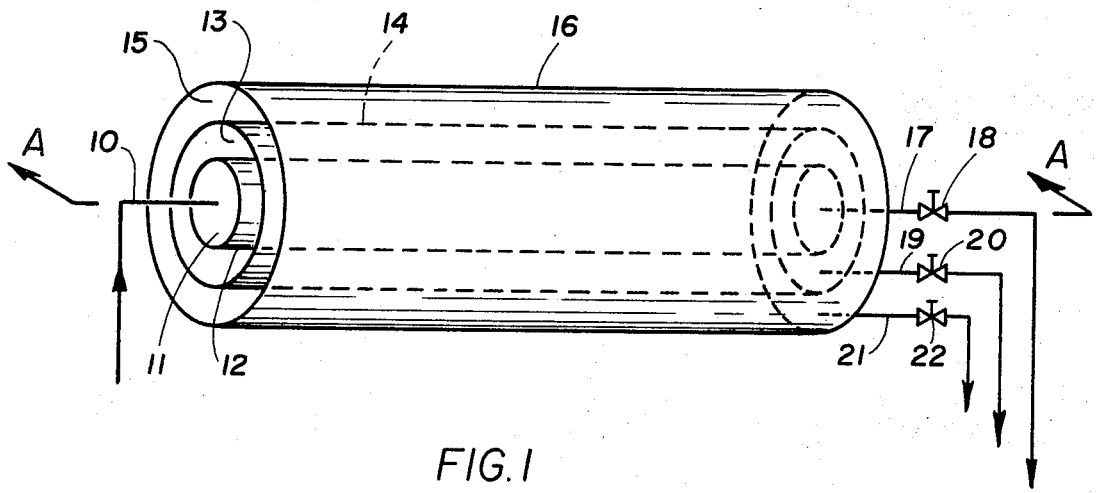
FIG. 1 is a schematic, horizontal view of a reverse osmosis separator unit having, for example, two semi-permeable membranes, one inner zone and two annular zones.

Referring to FIG. 1, a preferred embodiment of a reverse osmosis separation unit comprises an input feed line 10 for feeding a solution to be treated, such as seawater containing 36,000 parts per million (ppm) of dissolved salts to the unit. The feed line 10 feeds the input solution to a stage 11, which may be tubular, annular or spiral annular depending upon construction of the system. The outer boundary of stage 11 is defined by a tubular or spiral annular member 12 which is comprised of a first semi-permeable membrane and a structural matrix or backing material. The structural matrix or backing material, which physically supports the unit, is not shown so as not to unduly obscure the inventive concept. Around tubular member 12 is mounted a second tubular member 14, also made of a semi-permeable membrane and a structural matrix or backing material. An annular stage 13 is defined between the first membrane 12 and the second membrane 14. Around membrane 14, and speced therefrom is an outer shell member 16. A second annular stage 15 is defined between membrane 14 and outer shell 16. As mentioned above, the membranes and outer shell 16 are maintained in relative position by means of structural elements, not shown. End plates, also not shown, are provided as should be apparent to those skilled in the art.

An output line 17, with a valve 18 therein, removes the unpermeated solution from the first stage 11, an output line 19 with a valve 20 therein removes solution from the middle annular stage 13 and an output line 21 with a valve 22 therein removes solution from the outer annular stage 15. In accordance with the present invention, the solution removed from the outer stage 15 is the purified output solution.

As discussed in more detail hereinbelow, the valves 18, 20 and 22 are adjustable and may be used to vary the internal pressures in the various stages 11, 13 and 15.

The inner stage 11 may be annular, spiral annular or generally tubular. If an internal, centrally axial, support structure for the apparatus is used, then this will result in an annular inner stage 11. Alternatively, the interior of the stage 11 may be kept "free", thereby resulting in a generally tubular including spiral annular interior stage 11.

The membranes 12, 14 and the outer shell member 16 need not be circular in cross-section. If desired, the cross-sectional configuration of the apparatus may be oval, rectangular, polygonal, spiral, helical, etc. Various shapes may be mixed in a given separator unit. The particular configuration will depend upon the particular system requirements. For ease of description the term "tubular" is deemed to encompass all of the above configurations of the membranes and the outer shell.

Additional membranes may be used to define additional annular stages to successively treat the permeates from the next inner stage. Membranes having different rejection capabilities may be used, depending upon system requirements, and a particular unit may be comprised of membranes having different respective rejection capabilities.

Figure 2:
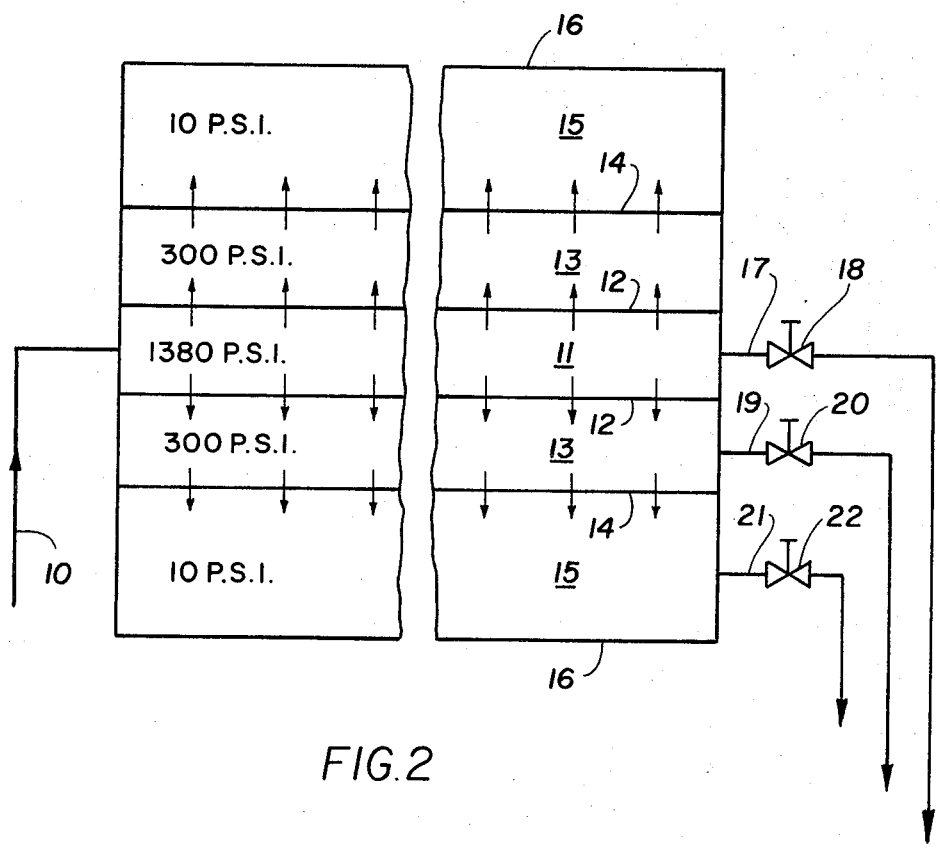
FIG. 2 shows a cross-sectional view of the unit of FIG. 1 taken along the line A—A.

A preferred technique for removing salts from seawater is illustrated by reference to FIGS. 1 and 2. Seawater, containing 36,000 parts per million (ppm) of dissolved salts is charged through line 10 at a pressure of about 1,380 pounds per square inch (psi), to first inner stage 11 comprised of first semi-permeable membrane 12 and a structural matrix or backing material. The capacity of membrane 12 for rejection of dissolved sodium chloride, the predominant component of the seawater, can be, for example, about 90 percent. Unpermeated solution is removed from stage 11 through line 17 containing valve 18. The output from line 17, when concentrated by a factor of two, would contain approximately 72,000 ppm of dissolved salts.

The permeate from stage 11 is obtained in a second annular stage 13 and will contain about 5,400 ppm of dissolved salts. Stage 13 is bounded by second semi-permeable membrane 14 and a structural matrix or backing material. Membrane 14 can be the same as membrane 12 or can be more or less permeable than membrane 12; preferably, for seawater desalination, it is in the order of 90 percent. In this illustration, membranes 12 and 14 are the same. Thus, the permeate from the first stage 11 (or the first or extreme inner tube) becomes the feed for the annular stage 13 (or the annulus space between the "extreme inner" and "next outer" tube). The reverse osmotic pressure requirement of the permeate in stage 13 is provided by maintaining a sufficient backpressure on line 17 by controlling valve 18. In this illustration, the pressure maintained in stage 13 is approximately 300 psi.

Unpermeated solution in stage 13 is removed therefrom through outlet 19 containing valve 20. As indicated above, this will contain about 11,000 ppm of dissolved salts when concentrated by a factor of two.

The permeate from stage 13 is obtained in a further annular stage 15 and contains about 800 ppm of dissolved salts. This permeate is removed from the system in stage 15 through line 21 containing valve 22. Pressure in this annular product water stage 15 may be negligible or positive to force the product water to a storage tank (not shown), for example, a collection zone.

It will be understood that one or more additional annular stage(s) can be employed in order that a permeate of lesser dissolved salts content can be obtained. In so modifying the unit described above for treating seawater, the initial pressure of the seawater feed can be greater than 1,380 psi illustrated here, such that the several interannular pressures will be sufficient to overcome the osmotic pressure in each successive annulus and permit further partial separation of dissolved salts from the successive solutes. As required, the interannular pressures can be controlled with valves 17, 19, 22, etc. such that there will be sufficient pressure in the penultimate annular stage to overcome the osmotic pressure in the final annular stage preceding the product water collection zone or annulus, if employed.

As illustrated above, initial pressurization of the seawater, or other aqueous solution to be purified, and subsequent control of the permeated and unpermeated (spent) solution fractions on each side of a reverse osmosis semi-permeable membrane for pressure control, eliminates interstage repressurization. It is to be noted that staged desalination accomplished by back-pressurization in the manner described minimizes the pressure drop across the membrane and provides some support to maintain the structural integrity thereof. Thus, it is possible to use thinner membranes to accomplish the described separations than without such pressure operations.

Reverse osmosis semi-permeable membranes suitable for desalination of aqueous solutions are well known in the art, and are useful for the purposes of this invention. Typical membranes include: Gulf General Atomic's spiral would units and American Standard's tubular units, which contain cellulose acetate membranes; du Pont's hollow, fine nylon fiber units. Nylon is a superpolymeric amide prepared from aliphatic dicarboxylic acids, such as adipic and sebacic acids and aliphatic diamines such as hexamethylene diamine. Power requirements for such units range from about 6 to about 11 kilowatt hours (kw-hr) per 1,000 gallons of deionized water.

Temperatures employed are not critical. Suitable temperatures are 60°–120°F.

Initial pressure of a solution charge will correspond to that required to exceed the osmotic pressure of the dissolved salt solution by an amount related to the membrane rejection characteristics of the membrane and the driving force needed for permeation of the membrane at the designated rejection rate and desired permeate flow rate for each stage. This initial pressure can vary, for seawater feed concentration from about 1,280 psig for a membrane having a salt-rejection characteristic of 90 percent or higher to as high as 4,500 psig for a membrane having a very high salt rejection rate (e.g., 99 percent).

Figure 3:
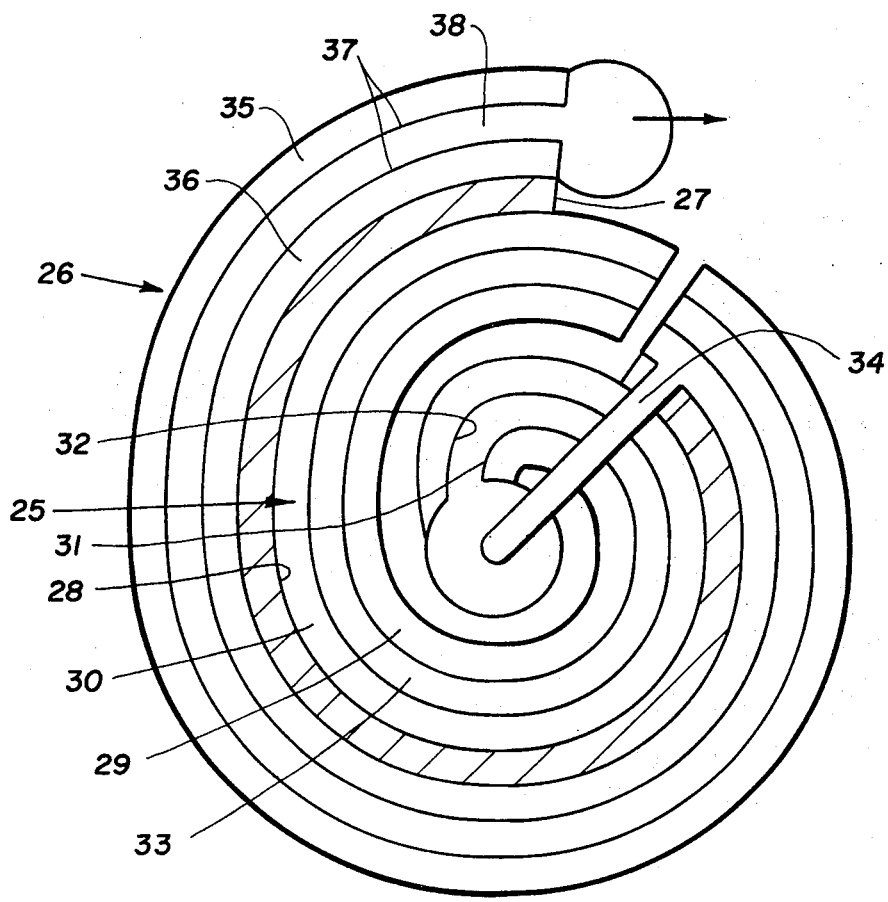
FIG. 3 shows a cross-sectional view of another embodiment of the present invention.
Figure 4:
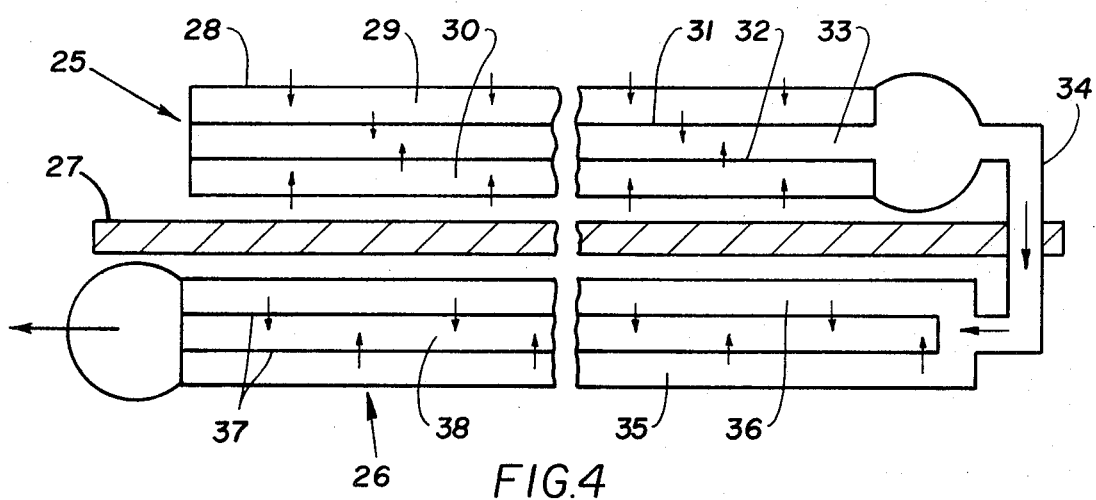
FIG. 4 shows the constituent elements of the embodiment of FIG. 3 in their unfolded state.

The present invention can be carried out by using spiral wound or "jelly roll" reverse osmosis semi-permeable membrane assemblies which are made, for example, by Gulf General Atomic Co. Such an arrangement is generally illustrated in FIGS. 3 and 4. In FIG. 4, the arrangement is shown in its "unfolded or unwound" state. The embodiment of FIGS. 3 and 4 is shown as containing two substantially annularly oriented units. It should be clear that the invention can be carried out using more than two units, as desired. The embodiment of FIGS. 3 and 4 generally includes two concentric "jelly-roll" membrane units 25 and 26 which are separated by a member 27. The input feed flow is through the outer layer 28 as indicated in FIG. 4. The input fluid flows in channels 29 and 30 and then permeates through membranes 31 and 32 into the central channel 33. The permeate from channel 33 then flows out and through connecting pipe 34 to the next stage 26. The permeate flowing in pipe 34 is fed through channels 35 and 36 of the second stage and permeates through the membrane 37 into the inner channel 38. The permeate from channel 38 is then fed out either to an output or to the next stage, as desired. FIG. 3 shows the structural elements of FIG. 4 in the rolled-up state to form a "concentric jelly-roll" configuration. in FIG. 3, it is seen that the two stages are rolled up such that the two stages are substantially concentric with each other to form a substantially annular arrangement.

It should be clear that other types of spiral wound units, or the like, could be used in carrying out the present inventive concept.

The invention has been illustrated by purification of seawater. It is to be understood that other aqueous solutions containing dissolved inorganic salts can also be so treated, including brackish waters.

I claim:

1. Process for removing inorganic salts from an aqueous solution (1) containing the same, comprising
   a. forcing the solution (1), under pressure, through a first reverse osmosis tubularshaped membrane enclosing a first interior stage of a reverse osmosis separator unit comprising a plurality of semi-permeable membranes in a substantially annulated arrangement, each membrane defining a respective stage and the outer membrane defining the final stage, and having a charge inlet connected to said first stage and an outlet connected to each stage thereof, each outlet including a "back" pressure controlling outlet valve, and obtaining in an annular stage adjacent said first stage an aqueous solution (2) of lesser salt content than of said solution (1),
   b. forcing said solution (2) under "back" pressure from said annular stage through a second reverse osmosis membrane of said unit and obtaining in a subsequent annular stage adjacent said annular stage an aqueous solution (3) of lesser salt content than solution (2), said "back" pressure being determined by the throttling effect provided by the settings of said "back" pressure controlling outlet valves,
   c. and maintaining the "back" pressure in said first and subsequent stages substantially above the respective osmotic pressures in said annular stages to permit passage of said solution (1) through said first reverse osmosis membrane, passage of said solution (2) through said second reverse osmosis membrane and passage of respective solutions through subsequent reverse osmosis membranes without interstage repressurization with a pump.

2. Process of claim 1, wherein said solution (1) is a seawater.

3. Process of claim 1, wherein said solution (1) is a brackish water.

4. Process of claim 1, wherein the pressure of said solution (1) is above about 1,400 psi.

5. Process of claim 1, wherein the pressure of said solution (1) is from about 1,400 to about 4,500 psi.

6. Process of claim 1, wherein solution (1) is under a pressure sufficiently high and wherein said "back" pressures are maintained sufficiently high that the pressure in the penultimate stage is sufficient to overcome the osmotic pressure in said final stage.

7. A reverse osmosis separator unit comprising:
   a plurality of semi-permeable membranes arranged in a substantially annulated arrangement, each membrane defining a respective stage and the outer membrane defining a final stage;
   charge inlet means connected to at least one of said stages for feeding a pressurized charge solution to said separator unit; and outlet means connected to each of said stages for drawing off a solution from each stage after the solution has passed through at least a longitudinal portion of the respective stages, each outlet means including a "back" pressure controlling outlet valve for maintaining the pressure in its respective stage substantially at a predetermined value which is sufficient to enable passage of the solution through said plurality of membranes without interstage repressurization with a pump.

8. A reverse osmosis separator unit according to claim 7 comprising an outer shell surrounding the outer membrane, said final stage being defined by the space between said outer membrane and said outer shell.

9. A reverse osmosis separator unit according to claim 7 wherein said valves are adjustable to vary the internal pressures in the respective stages.

10. A reverse osmosis separator unit according to claim 7 wherein said semi-permeable membranes are of generally round cross-section.

11. A reverse osmosis separator unit according to claim 7 wherein each of said membranes has substantially the same rejection characteristic.

12. A reverse osmosis separator unit according to claim 7 comprising membranes having different rejection characteristics.

13. A reverse osmosis separator unit according to claim 7 wherein said first stage is a tubular-shaped zone.

14. A reverse osmosis separator unit according to claim 7 wherein said charge inlet is connected to said first stage, which is the inner-most stage.

15. A reverse osmosis separator unit according to claim 7 wherein each of said stages is defined by a spiral wound membrane unit.

16. A reverse osmosis separator unit according to claim 15 wherein each of said spiral wound units comprises a central fluid passage surrounded by a semipermeable membrane; and means forming outer fluid passages surrounding said semi-permeable membrane through which charge is fed to said stage.

17. A reverse osmosis separator unit according to claim 15 comprising pipe means interconnecting successive spiral wound stages.

18. A reverse osmosis separator unit according to claim 7 wherein said membranes are spirally wound in a substantially annulated arrangement.

* * * * *